Jan. 9, 1945.　　　　P. E. MALSON　　　　2,367,172
DISPOSAL OF REFINERY WASTES
Filed May 25, 1942
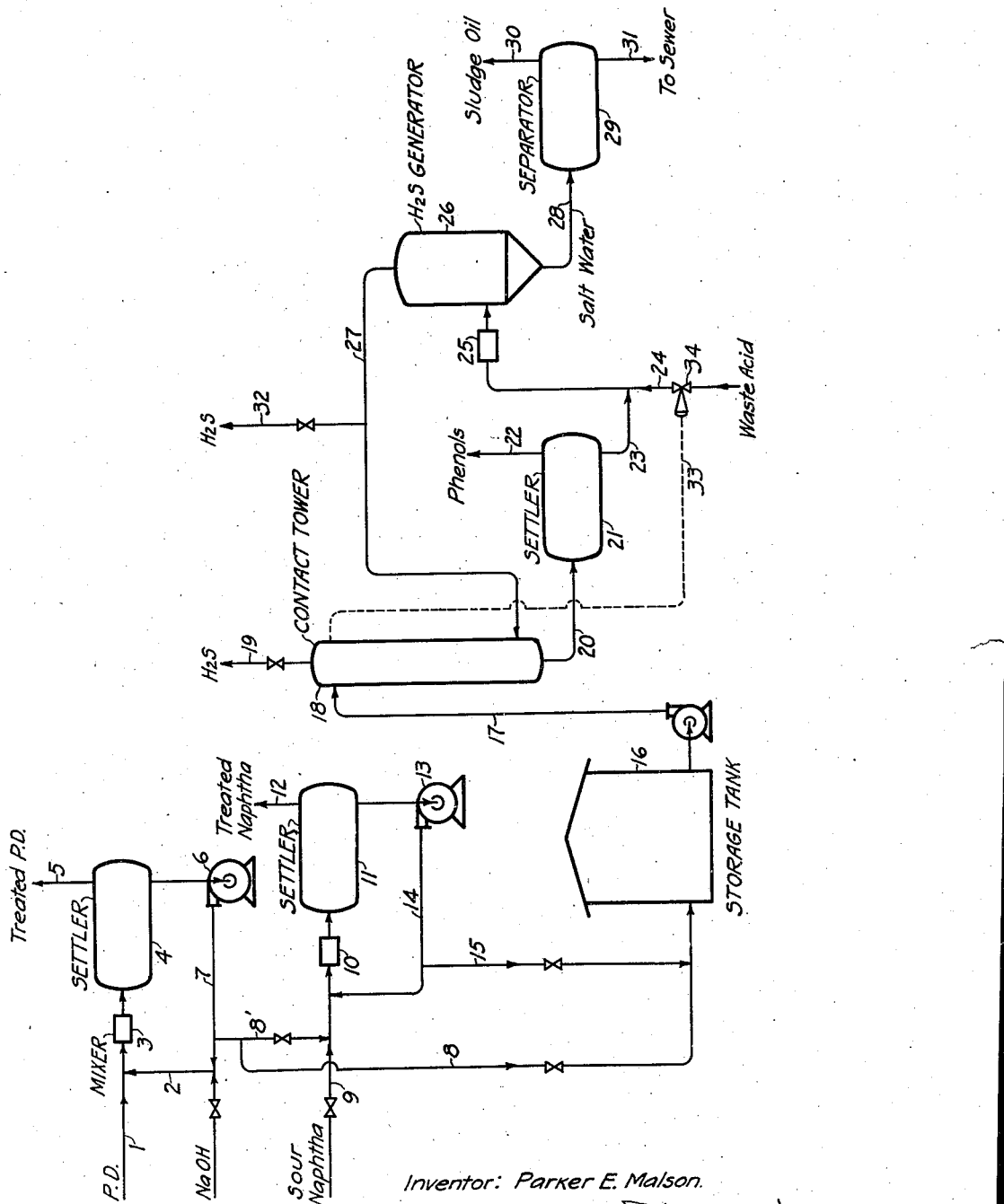
Inventor: Parker E. Malson.
By his Attorney:

Patented Jan. 9, 1945

2,367,172

UNITED STATES PATENT OFFICE 2,367,172

DISPOSAL OF REFINERY WASTES

Parker E. Malson, East Alton, Ill., assignor to Shell Development Company, San Francisco, Calif., a corporation of Delaware Application May 25, 1942, Serial No. 444,479

6 Claims. (Cl. 260—627)

This invention deals with a method for disposing of petroleum refinery wastes and simultaneously recovering valuable products. More particularly, it deals with a combination process in which spent aqueous caustic alkali and waste acids are combined in such a manner that valuable alkyl phenols can be recovered at no extra expense of chemicals with the simultaneous production of unobjectionable effluent which can be disposed into sewers.

It is a purpose of this invention to dispose of waste caustic alkali in such a way as to produce a sewer water free from objectionable matter. It is another purpose simultaneously to recover valuable alkyl phenols and $H_2S$ from waste caustic. It is still another purpose to utilize waste acids such as sludge acids obtained in the refining of hydrocarbons, which acids contain organic matter for neutralizing the waste alkali in such a way as to liberate alkyl phenols which are not contaminated by said organic matter.

My invention comprises treating cracked hydrocarbon distillates and the like containing alkyl phenols, preferably at about normal room temperature, with a strong aqueous solution of caustic alkali, i. e., alkali metal hydroxide, whereby a spent aqueous solution is produced containing alkali metal alkyl phenolates, saturating this solution with $H_2S$ produced within the process to liberate the phenols, separating the phenols, thereafter contacting the remaining aqueous solution with waste acid such as acid sludge produced in refinery operations, under conditions such that $H_2S$ is liberated which is recirculated into the process to liberate phenols, and an aqueous salt solution is produced normally containing suspended organic material. This solution is allowed to settle to remove the organic matter, if present, and the salt solution is then run to the sewers.

My process is more readily understood from the accompanying drawing representing a simplified flow diagram of an actual plant installation. Referring to the drawing, pressure distillate (P. D.) containing alkyl phenols, mercaptans, $H_2S$, etc., enters the system through line 1. The pressure distillate is mixed with strong aqueous sodium hydroxide introduced through line 2 in mixer 3, and the mixture is allowed to separate in settler 4. Treated distillate is withdrawn through line 5 and partially spent sodium hydroxide solution containing alkyl phenolates is pumped by pump 6 through line 7. A portion of this solution is recirculated through line 2 in combination with fresh NaOH, and the remainder of the at least partially spent solution passes through line 8 to tank 16; or as an alternative through line 8' to meet sour naphtha containing $H_2S$ in line 9. The mixture resulting from the second alternative passes through mixer 10 into settler 11. Treated naphtha is withdrawn through line 12 and spent aqueous NaOH solution is pumped by pump 13 through line 14, a portion returning to mixer 10 and the remainder going through line 15 to storage tank 16. Care should be taken that the amount of $H_2S$ taken up from the sour naphtha is not sufficient to spring the phenols already present in the NaOH solution from settler 4, as otherwise the yield of alkyl phenols in the subsequent recovery step would be reduced.

From this tank, the spent solution then proceeds through line 17 to contact tower 18, where it is contacted, preferably at about normal room temperature with an amount of $H_2S$ which may be in excess of that which can be taken up by the aqueous solution. Excess $H_2S$, if any, passes through top line 19, while aqueous sodium sulfide solution saturated with $H_2S$ proceeds through line 20 to settler 21, together with alkyl phenols liberated by the $H_2S$. The phenols are allowed to separate.

The amount of $H_2S$ used in the step of liberating alkyl phenols should not be less than that required to impart to the solution a pH value of 8.5 or slightly lower, which point can easily be recognized with the aid of phenolphthalein indicator. If the pH value is higher, none or a portion only of the alkyl phenols may be liberated, and also those which are liberated contain substantial amounts of alkali which is undesirable.

The remaining aqueous solution substantially free from alkyl phenols now proceeds through bottom line 23 and is admixed with an amount of waste acid introduced through line 24. The mixture passes through mixer 25 and is then introduced into $H_2S$-generator 26 wherein the waste acid generates $H_2S$, the latter going through line 27 to tower 18. The amount of waste acid should be so proportioned to result in a salt water solution substantially free from sulfides. This can be achieved by maintaining a pH value below 7, preferably between 6 and 7, in the aqueous solution after addition of the waste acid. If a higher pH value is maintained, insufficient $H_2S$ will normally be released for complete liberation of alkyl phenols in the preceding stage, and, moreover, the remaining waste liquor will contain relatively large amounts of sulfides which are highly objectionable components of sewer water. If desired, the waste liquor may be heated to drive out $H_2S$ more completely.

If more $H_2S$ is produced in generator 26 than is needed for the liberation of the alkyl phenols, excess may be withdrawn through line 32.

If the disposal of excess $H_2S$ as part of the sewer water in the form of sodium sulfide is permissible, an automatic regulation of the amount of waste acid introduced through line 24 may be governed by the pressure of $H_2S$ in the top of the contact tower 18 through connection 33 and automatic valve 34. By this means, only sufficient sludge acid is introduced through line 24 to release the exact amount of $H_2S$ required to spring the alkyl phenols. It is convenient to set the regulator to maintain an $H_2S$ pressure in the contact tower 18 of about 5–15#/in.$^2$ gauge.

The resulting salt water, which is preferably substantially free from sulfides but may contain organic matter, is withdrawn through bottom line 28 and passes to separator 29 wherein the organic matter, such as sludge oil, is settled out and withdrawn through line 30. The salt water substantially free of organic matter emerges through line 31 and goes to the sewer.

The described process has several advantages. In the first place, it makes possible a substantially complete utilization of the caustic needed in treating cracked and straight-run naphtha. It makes possible the utilization of waste acid for neutralizing spent caustic in such a manner that phenols and $H_2S$ can be separately recovered. It makes possible the production of a waste water which is substantially free from obnoxious materials which, if present, would make disposal of the waste water through sewer systems objectionable; and further, it makes possible the separate disposal of sludge oil which is present in the waste acid.

Acids used for liberating $H_2S$ from the sulfide solution produced in the process may comprise various water-soluble acids stronger than $H_2S$. I prefer to use sludge acids, such as are obtained in the treatment of aviation gasolines, cracked distillates, lubricating oils, etc., with sulfuric acid, or may comprise spent alkylation acids or other strong mineral acids used in various refining processes, such as phosphoric acid sludges that are produced in certain special refinery operations, aqueous hydrochloric acid, etc.

Below are some typical operating data of a plant installation in actual operation:

| | Pressure psi gauge | Temperature °F | pH |
|---|---|---|---|
| Contact tank 18 | 5–10 | 40–100 | 8.2 |
| Settler 21 | 20–35 | 40–100 | 8.2 |
| $H_2S$ generator 26 | 5–15 | 115–150 | 6.0–7.0 |

Typical properties of the aqueous solution during various stages of the process are shown in the table below:

| Property | Spent NaOH from separator 4 | Spent NaOH from separator 11 | Sodium sulfide solution from scrubber 18 | Salt water from separator 29 |
|---|---|---|---|---|
| NaOH gm./100 cc | 13 | | | |
| $Na_2S$ gm./100 cc | 7.0 | 10.0 | 1 | |
| NaHs gm./100 cc | | 14.0 | 26 | |
| Alkyl phenols, percent volume | 26 | 22 | | .05 |
| $H_2SO_4$, percent by weight | | | | 2 |
| $NaHSO_4$, percent by weight | | | | 12 |

As will be noted, in the above process two types of highly obnoxious waste products can be disposed in a manner to yield a single waste water free from compounds which cannot safely be run to the sewers. Simultaneously, valuable phenols are produced free from organic matter which would contaminate them if the spent caustic alkali solution were directly neutralized with sludge acid. As a further by-product, $H_2S$ is obtained.

Thus, the alkyl phenols recovered by this process, while usually of high sulfur content, are of sufficient purity so that they can be used as such for many purposes; or else they can be desulfurized by standard methods for the desulfurization of alkyl phenols, such as air blowing in the acid state, or in alkaline aqueous solutions and separating products of oxidation.

I claim as my invention:

1. In a process for recovering alkyl phenols from hydrocarbon oils containing them and hydrogen sulfide and simultaneously disposing of waste products, the steps comprising treating said hydrocarbon oils with an aqueous alkali metal hydroxide solution to produce a solution containing alkyl phenolates, contacting the latter with $H_2S$ in an amount sufficient to liberate alkyl phenols, separating liberated alkyl phenols, adding to the remaining aqueous solution a sludge acid containing organic matter resulting from treatment of hydrocarbons with a sulfuric acid, said sludge acid being added in an amount sufficient to form a neutral solution, whereby a salt solution is produced containing said organic matter in suspension and gaseous $H_2S$ is liberated, returning liberated $H_2S$ to said contacting step, separating said organic matter from said salt solution, and separately withdrawing the latter.

2. The process of claim 1 wherein said amount of acid added to said solution is automatically regulated by the pressure of the $H_2S$ employed during said contact step.

3. The process of claim 1 wherein said amount of acid added to said solution is automatically regulated to maintain between about 5 and 15 pounds per square inch pressure gauge of $H_2S$ employed during said contact step.

4. The process of claim 1 wherein the amount of $H_2S$ to liberate said alkyl phenols is sufficient to reduce the pH value of said solution to below 8.5.

5. The process of claim 1 wherein said salt solution is heated to drive out dissolved $H_2S$.

6. The process of claim 1 wherein said salt solution is heated to about 115–150° F. to drive out dissolved $H_2S$.

PARKER E. MALSON.